US012770783B2

(12) United States Patent
Drofenik et al.

(10) Patent No.: US 12,770,783 B2
(45) Date of Patent: Oct. 20, 2026

(54) WINDING CONFIGURATION AS PART OF AN INTEGRATED STRUCTURE FOR A MEDIUM FREQUENCY TRANSFORMER

(71) Applicant: Hitachi Energy Ltd, Zürich (CH)

(72) Inventors: Uwe Drofenik, Zürich (CH); Thomas Gradinger, Aarau Rohr (CH)

(73) Assignee: Hitachi Energy Ltd, Zürich (CH)

(*) Notice: Subject to any disclaimer, the term of this patent is extended or adjusted under 35 U.S.C. 154(b) by 1075 days.

(21) Appl. No.: 17/762,064

(22) PCT Filed: Aug. 21, 2020

(86) PCT No.: PCT/EP2020/073493
§ 371 (c)(1),
(2) Date: Mar. 20, 2022

(87) PCT Pub. No.: WO2021/052713
PCT Pub. Date: Mar. 25, 2021

(65) Prior Publication Data

US 2022/0375678 A1 Nov. 24, 2022

(30) Foreign Application Priority Data

Sep. 20, 2019 (EP) .................................... 19198708

(51) Int. Cl.
*H01F 41/063* (2016.01)
*H01F 27/28* (2006.01)
(Continued)

(52) U.S. Cl.
CPC ....... *H01F 41/063* (2016.01); *H01F 27/2847* (2013.01); *H01F 27/29* (2013.01);
(Continued)

(58) Field of Classification Search
CPC ....... H01F 2027/2857; H01F 2027/061; H01F 2027/063; H01F 27/323; H02M 3/01; H02M 3/015
See application file for complete search history.

(56) References Cited

U.S. PATENT DOCUMENTS 3,633,273 A * 1/1972 Wilburn .............. H01F 27/2847 29/605
4,048,593 A 9/1977 Zillman
(Continued)

FOREIGN PATENT DOCUMENTS

CH 707533 A2 7/2014
CN 105321657 A 2/2016
(Continued)

OTHER PUBLICATIONS

Decision to Grant, Japanese Patent Application No. 2022-517938, mailed Oct. 3, 2023, 3 pages.
(Continued)

*Primary Examiner* — Livius R. Cazan
(74) *Attorney, Agent, or Firm* — Sage Patent Group

(57) ABSTRACT

A method for producing a coil for a transformer, in particular for a medium frequency transformer for a resonant DC/DC converter or a dual active bridge DC/DC converter, is disclosed which: providing a plurality of M>1 conductive foil strips, each having a first ending and a second ending; stacking the plurality of conductive foil strips to obtain a foil strip stack having a first ending and a second ending, wherein an electrically insulating layer is provided between any two adjacent foil strips; electrically interconnecting the first endings of all conductive foil strips to a first terminal; for each of the conductive foil strips providing a connector at the second ending of the foil strip; and coiling up the foil strip stack from the first end.

20 Claims, 7 Drawing Sheets

(51) Int. Cl.

| | |
|---|---|
| ***H01F 27/29*** | (2006.01) |
| ***H01F 27/32*** | (2006.01) |
| ***H01F 41/068*** | (2016.01) |
| ***H01F 41/12*** | (2006.01) |
| ***H02M 3/00*** | (2006.01) |
| ***H02M 3/335*** | (2006.01) |

(52) U.S. Cl.

CPC ......... *H01F 27/323* (2013.01); *H01F 27/324* (2013.01); *H01F 41/068* (2016.01); *H01F 41/125* (2013.01); *H02M 3/01* (2021.05); *H02M 3/33571* (2021.05); *H01F 2027/2857* (2013.01)

(56) References Cited

U.S. PATENT DOCUMENTS

| | | | | |
|---|---|---|---|---|
| 4,105,931 | A | 8/1978 | Pritchard et al. | |
| 4,860,184 | A | 8/1989 | Tabisz et al. | |
| 6,344,979 | B1 | 2/2002 | Huang et al. | |
| 7,088,594 | B2 | 8/2006 | Sase et al. | |
| 8,183,966 | B2 * | 5/2012 | Xu | H01F 27/2847 336/212 |
| 2008/0186122 | A1 | 8/2008 | Xu et al. | |
| 2009/0322462 | A1 | 12/2009 | Lindholm et al. | |
| 2015/0279549 | A1 | 10/2015 | Sullivan et al. | |
| 2015/0355593 | A1 | 12/2015 | Uchiyama | |
| 2017/0221625 | A1 * | 8/2017 | Sullivan | H01F 27/2804 |
| 2018/0159435 | A1 | 6/2018 | Klaes | |
| 2019/0115137 | A1 | 4/2019 | Kaneko et al. | |

FOREIGN PATENT DOCUMENTS

| | | | | |
|---|---|---|---|---|
| DE | 2644398 | A1 | 4/1977 | |
| GB | 872073 | A | 7/1961 | |
| JP | S59159189 | U | 10/1984 | |
| JP | S61234513 | A | 10/1986 | |
| JP | H0574642 | A | 3/1993 | |
| JP | 2009193977 | A | 8/2009 | |
| JP | 2015233103 | A | 12/2015 | |
| JP | 2018190763 | A | 11/2018 | |
| WO | WO-9949481 | A1 * | 9/1999 | H01F 27/25 |
| WO | WO 2018/141092 | A1 | 8/2018 | |

OTHER PUBLICATIONS

Office Action mailed Aug. 30, 2023, Chinese Patent Application No. 202080065862.6, 8 pages.

International Search Report and Written Opinion of the International Searching Authority, PCT/EP2020/073493, mailed Nov. 5, 2020, 17 pages.

Extended European Search Report EP19198708.0, mailed Mar. 12, 2020, 14 pages.

Tang Tianzhu, et al., "Design of a Medium Frequency Transformer with High Insulation Level for Dual Active Bridge DC-DC Converter," 2019 10$^{th}$ International Conference on Power Electronics and ECCE Asia (ICPE 2019—ECCE Asia), the Korean Institute of Power Electronics (KIPE), May 27, 2019 (XP033596858) 8 pages.

Notice of Reasons for Refusal, Japanese Patent Application No. 2022-517938, mailed Apr. 28, 2023, 5 pages.

* cited by examiner

WINDING CONFIGURATION AS PART OF AN INTEGRATED STRUCTURE FOR A MEDIUM FREQUENCY TRANSFORMER

CROSS REFERENCE TO RELATED APPLICATIONS

This application is a 35 U.S.C. § 371 national stage application of PCT International Application No. PCT/EP2020/073493 filed on Aug. 21, 2020, which in turn claims foreign priority to European Patent Application No. 19198708.0, filed on Sep. 20, 2019, the disclosures and content of which are incorporated by reference herein in their entirety.

FIELD OF THE INVENTION

The invention pertains to the field of power electronics. It relates to a coil for a medium frequency transformer of a resonant DC/DC converter or a dual active bridge DC/DC converter and to a method for producing such a coil in accordance with the independent patent claims.

BACKGROUND OF THE INVENTION

Transformers which deal with high current (several 100 Amps and more, in particular above 200 A) at high frequencies of several kilohertz (in particular above 3 kHz or much higher) are very difficult to build with low-cost and/or off-the-shelf components due to several effects which are negligible at lower frequencies, in particular at frequencies below 1 kHz, and/or for low currents, in particular currents below 100 A. Typical applications involving such high frequencies and/or currents are medium frequency transformers (MFT, FIG. 2) as frequently used in solid state transformers (SST, FIG. 1), especially for SSTs configured as AC/DC converters for connected distributed power to the medium voltage (MV) grid as in:

Electric vehicle (EV) fast charging
Photovoltaic (PV) solar
Battery energy storage systems (BESS)
Wind onshore and offshore and
Datacenter Additionally, transformers without MV insulation requirements as frequently used in high-power low-voltage DC/DC converters with galvanic insulation which are required in the charging pole of EV fast chargers may be connected. Two particular examples of such DC/DC converters are dual active bridge converters, as exemplary described in Swiss patent application publication CH 707 533 A2 or US patent application publication CH 2018/0159435 A1, both of which are hereby included by reference in their entirety; and resonant DC/DC converters as exemplary described in PCT patent application WO 2018/141092 A1, which is hereby also included by reference in their entirety.

For keeping high-frequency losses in transformer coils small, one way is to employ litz wire to form the coils' windings. While litz wire is several times more expensive than solid copper wire, it may be purchased "off-the-shelf" for AC currents up to 100-200 A (root-mean-square, rms). Litz wire consists of a large number of transposed strands generally made from copper, and is available off-the-shelf in total cross-sections up to 0.5 $cm^2$ which allows maximum current in the range of 100-200 Arms (assuming a filling factor of 0.8 and a current density of 2.5 . . . 5 $A/mm^2$). Larger currents, as they are typical in above listed applications, require larger cross sections and will be increasingly difficult to bend. Litz wire is usually not made from aluminum because with aluminum it is extremely difficult to reliably contact all strands at a wire terminal (e.g. 900 strands of 0.2 mm diameter each in above mentioned copper litz wire). Copper litz wire is at least 2-4 times more expensive than solid copper, and copper is around 3 times more expensive than aluminum. For higher current (>100 A) as they are typical in the applications listed above, several copper litz wires have to be paralleled, which often results, due to stray flux between the paralleled wires, in circulating currents, which can increase the losses significantly.

For optimization and/or minimization of manufacturing effort and required resources, aluminium foil windings as commonly employed in 50 Hz transformers would be a favoured choice for the coils. At high frequency, the winding losses in a foil increase significantly due to skin- and proximity effects. If a single foil is employed, the frequency defines a required foil thickness, a desired or required current defines a foil height, and this results in a transformer height. For large current and high frequency, the transformer shape will thus strongly deviate from a cube-shape which results much higher weight, core losses, and increased requirement in resources and effort (higher core volume required).

If parallel foils are employed, the foil height can be reduced, but due to the stray field between paralleled foils strong circulating currents may be induced, which increase losses significantly (same effect as with paralleled wire).

In both designs, copper litz wire and foil, a main problem may include circulating currents between the parallel conductors which increase winding losses, often significantly, thereby reducing a transformer power rating, and/or significantly increase a transformer cost (USD/kW). In prospective distributed energy applications like EV fast charging, PV solar, battery energy storage systems, wind, or datacentre, the medium frequency transformer (MFT) is a key component. For higher currents (in particular above 100 A), simply scaling up 50/60 Hz technology and/or employing off-the-shelf litz wire or low-cost foil wire results in huge losses due to high-frequency induced circulating currents which reduce transformer performance significantly.

Generation of circulating currents, in particular in a configuration of two windings connected in parallel, with each winding comprising a plurality of turns, may be understood as follows: Each of the turns is exposed to a magnetic stray field, e.g. in a windings window formed by a core of the transformer. Parallel litz wires forming individual windings which are connected at input and output terminals of the transformer form a loop which is exposed to the magnetic stray field. The magnetic stray field changes with the MFT's operating frequency, resulting in a voltage which drives a circulating current in this loop. The circulating current adds to a nominal current in the MFT which may result in one litz wire carrying more than half of the nominal current, and the parallel one carrying accordingly less than half of the nominal current. If the circulating current is large enough, one litz wire can carry more than a total nominal current, and then the parallel one carries a negative (180° phase-shifted) current. In this way, not only is a total available copper cross section effectively reduced by 50%, but additional losses are introduced, and a maximum output power of the MFT is reduced by a factor two or more.

State-of-the-art solutions to limit circulating currents require extra components, higher manufacturing effort and additional space, and may lead to additional problems. One state-of-the-art solution, transposition of wires or foils connected in parallel, as for example provided by parallel wires twisted around one another or otherwise intertwined or interlaced, requires additional manufacturing effort, especially for foil windings, leads to an increased effective wire-length, exhibits limited efficiency in MFTs with only a few winding turns and may lead to high voltage insulation challenges, e.g. due to geometric inhomogeneities in a vicinity of transposition locations. Alternatively, common-mode filters may be added between the parallel wires or foils. However, this requires additional components, may thus lead to higher cost and higher manufacturing effort, and require additional space and/or other resources.

It is an object of the invention to allow to provide a coil for a transformer that allows for efficient suppression of circulating currents, and a method for producing such a coil.

SUMMARY OF THE INVENTION

This object is achieved by a coil and a method in accordance with the independent patent claims. Further exemplary embodiments are evident from the dependent claims and the following description in combination with the accompanying drawings.

A method in accordance with the invention for producing a coil for a transformer, in particular for a medium frequency transformer for a resonant DC/DC converter or a dual active bridge DC/DC converter, comprises the steps of: providing a plurality of M>1 conductive foil strips, each having a first ending and a second ending; stacking the plurality of conductive foil strips to obtain a foil strip stack having a first ending and a second ending, wherein an insulating layer is provided between any two adjacent foil strips; electrically connecting the first endings of all conductive foil strips to a first terminal; for each of the conductive foil strips providing a connector at the second ending of the foil strip; and coiling up the foil strip stack from the first end.

Starting point for the method are a plurality of M>1 of conductive foil strips, made from an electrically conducting foil, in particular aluminum foil. Each foil strip may have a width w, in particular in a first or lateral direction; a length l, in particular in a second or longitudinal direction preferably perpendicular to the first direction; and a thickness d, in particular in a third direction preferably perpendicular to both the first and second directions. All foil strips may have at least essentially identical dimensions. Width and length of each foil strip may be both much larger than thickness, i.e. w>>d and l>>d. Each foil strip may thus be at least essentially rectangular, or at least have a rectangular basic form. Strips may also be elongate, i.e. l>w, preferably l>>w. Each foil strip has a first ending and a second ending with respect to the longitudinal direction. Each foil strip may have an effective cross section of w·d, which may be at least essentially constant along said foil strip's length l.

In a first step, the foil strips are stacked, with their first endings and the second endings positioned above one another. In electric insulation is provided between any two adjacent or neighboring foil strips. Said electric insulation layer may, in particular, be provided by a separate and/or additional insulating layer stacked and/or placed between any two adjacent or neighboring foil strips. The separate and/or additional insulating layer may have at least essentially the same width w and length l as the foil strips. Further additional insulation layers may be provided at a bottom and on top of the stack. Alternatively or additionally, the electric insulation also be formed by a part of one or both of the adjacent or neighboring foil strips, which may comprise a conductive layer laminated onto a foil insulation layer, or laminated between two foil insulation layers.

A resulting stack of foil strips may have at least essentially the same width w and length l as the foil strips, and a total thickness of D, wherein w>>D and/or l>>D may hold. The stack may thus also be at least essentially rectangular, or at least have a rectangular basic form. As with the individual foil strips, the stack has a first ending and a second ending with respect to the longitudinal direction, with the first ending of the stack located near the first endings of the foil strips and the with the second ending of the stack located near the second endings of the foil strips; or, in other words, with the first ending of the stack located closer to the first endings of the foil strips than to the second endings, and vice versa.

In a further step, the first endings of all the conductive foil strips are connected to a first terminal by a first terminal connection, in particular for simple, fast and secure electric connection of the finished coil to and/or within a converter circuit. Preferably, each one of all the first endings is connected directly to the first terminal. Alternatively, the first endings may be connected in series, with the first ending of one foil strip only connected directly to the first terminal.

In a further step, a plurality of M connectors are provided, i.e. one connector for each foil strip. Each one of the plurality of M connectors is connected to a different one of the plurality of N conductive foil strips. The connectors may be formed integrally with each foil strip, e.g. by or from an additional foil strip section which extends beyond the second ending of the foil strip, and has been folded and/or twisted to form a cable- or wire-like conductor. More generally, the connectors may comprise any kind of termination, in particular terminal, provided or formed at the second ending, and allowing for connection of some kind of conductor, in particular a cable or a wire, preferably without any reduction in cross section below the one of the respective foil strip.

In a further step, the stack of foil strips is coiled up, scrolled up or rolled up, beginning at and/or from the first ending, in and/or along the longitudinal direction, i.e. preferably at least essentially parallel to the longitudinal direction, to obtain a coil having a number $N_{turn}$ of turns. Said coil may have a shape which at least essentially resembles a cylinder shell, barrel or jacket, having a height h at least approximately equal to the width w of the foil strips. The coil may further have or define a central opening, which may have an at least essentially cylindrical shape, wherein a longitudinal axis of said cylindrical shape may extend at least essentially parallel to the lateral direction. The central opening may, in particular, be configured to receive a section of a transformer core.

The transformer core may in particular be made from magnetic material with a high magnetic permeability, in particular a ferrolectric or ferrielectric material, and comprise a first limb, extending in a first direction which may correspond to the lateral direction, a second limb, in particular extending in the first direction, a first yoke extending in a second direction, in particular perpendicular to the first direction, and a second yoke, in particular extending in the second direction. A core window may extend through the core in a third direction perpendicular to both the first and second directions. Preferably, dimensions $D_1$ and $D_2$ of the core in the first and/or second directions are significantly larger than a dimension $D_3$ of the core in the third direction, i.e. $D_1>D_3$ and/or $D_2>D_3$, preferably with $D_1>>D_3$ and/or $D_2>>D_3$ so that the core may be regarded as essentially planar; albeit with a non-zero dimension $l_3$ of the core window in the lateral direction, in general with $l_3 \approx D_3$, and frequently with $l_3 = D_3$. Both the first and second limb may extend from the first to the second yoke and vice versa, and surround the core window.

In transformer designs generally referred to as shell type, the first and second limb may extend between the first and second yoke and vice-versa, and surround the core window. A third limb may extends between the first and second yoke, in particular in the first direction; and between the first and the second limb, so that the core window is divided into a first sub-window and a second sub-window, preferably with both sub-windows extending through the core in the third direction.

The core may in particular be a closed core, i.e. no gaps, in particular no air gaps, are present within any of the limbs or yokes, nor between any pair of limb and yoke, so that the magnetic flux linking the primary and secondary windings travels—at least essentially—entirely within the magnetic material which constitutes the core, so that—at least essentially—no loss of magnetic flux through air occur. The core—rather than being a closed core—may alternatively comprise one or more core gaps filled with a material-having a magnetic permeability significantly lower than the magnetic material of the core, in general air and/or synthetic material, in particular plastics. A number $N_{gap}$ of core gaps provided in one limb may be considered as separating said limb into $N_{gap}+1$ portions. Neighboring portions of the limb may be spaced apart by a distance $d_{core}$, which may, but need not, be equal for all core gaps gaps.

The plurality of $N_{turn}$ conductive foil strips thus form a plurality of windings which are connected in parallel at their first endings, and may be regarded as intertwined, in particular within one another. Alternatively, the windings may be regarded as forming interdigitated spirals, which are connected to one another and to the first terminal at their inner ends. The windings are, however, free of transpositions, and are, in particular, not twisted around one another.

In an optional further step, a second terminal and a plurality of M impedance elements, in particular M capacitors or M inductors, may be provided, and a different one of said impedance elements may be connected between the second terminal and each of the connectors. The second terminal may in particular allow for simple, fast and secure electric connection of the finished coil to and/or within a converter circuit.

Once the stack of foil strips is coiled up, scrolled up or rolled up, the coil thus obtained may be cast into an electrically insulating material, which may subsequently be cured, e.g. by polymerization, in particular a resin. If impedance elements were provided between the second terminal and the connectors, these impedance elements may or may not be cast into the insulating material together with the coil. The cast may be formed such that the first terminal, the second terminal, and/or the connectors are readily accessible, in particular from a periphery of the coil, for simple, fast and secure electric connection.

Instead of casting a single coil into electrically insulating material, a plurality of coils may also be produced in accordance with one of the method variants described above, and stacked on top of one another to form a stack of coils, wherein the central openings of all the coils may be at least essentially aligned, and in particular configured to receive a section or portion of a transformer core, which may be essentially straight and/or elongated, so that said section extends or portion through the central openings of all the coils.

Heights $h_1$, $h_2$, $h_3$ of individual coils may differ. This allows to realize different total effective heights $h_{eff}$ (corresponding to a sum of all the individual heights) from a limited number of discrete widths $w_1$, $w_2$, $w_3$ of foil strips.

Two neighboring coils may be spaced apart, in particular in at least essentially the lateral direction, by a distance $d_{coil}$, which may in particular be significantly smaller than heights $h_1$, $h_2$ of both neighboring coils, so that a coil gap results between said neighboring coils. A stack comprising a plurality $N_{coil}$ of coils may comprise a plurality of $N_{gap}-1$ coil gaps. It has been surprising that the presence of one or more coil gaps may contribute to reduction of circulating currents when comparing a stack of coils with a total effective height $h_{eff}$ (corresponding to a sum of all the individual heights of the coils in the stack) to a single coil of identical height $h=h_{eff}$.

One or more gaps between neighboring coils may at least essentially be aligned with one or core gaps, wherein the distance $d_{coil}$ may be somewhat larger than the distance $d_{core}$ of the corresponding core gap, in particular by a factor between 1.5 and 10, or between 2 and 5. Further, in particular, for a core gap extending between coordinates $x_1<x_2$ along the first direction, and a coil gap extending between $x'_1<x'_2$ in the lateral direction, in particular at least essentially corresponding to the first direction, $x_1>x'\mathbf{1}$ may hold as well as $x_2<x'_2$. Alternatively $x_1<x'_1$ may hold as well as $x_2>x'_2$. Further $x_1 \approx x'_1$ and/or $x_2 \approx x'_2$ may hold. In other words, a first limb portion of a limb my extend through the central opening of a first one of one of the two neighboring coils, while a second limb portion, in particular a different portion of the same limb, may extend through the central opening of a second one of one of the two neighboring coils.

The first terminals of all the coils may be connected together, in particular at a first stack terminal. The whole stack of coils may be cast into an electrically insulating material, which may subsequently be cured, e.g. by polymerization, in particular a resin. If impedance elements were provided between the second terminal and the connectors of the coils, these impedance elements may or may not be cast into the insulating material together with the coils. The cast may be formed such that the first stack terminal, the second terminals, and/or the connectors are readily accessible, in particular from a periphery of the coil, for simple, fast and secure electric connection.

A coil or a winding configuration for a transformer, in particular a medium frequency transformer for a resonant DC/DC converter or a dual active bridge DC/DC converter in accordance with the invention coil comprises a pair of windings, said pair of windings comprising a first winding made of conductive foil strip and comprising a first plurality of turns surrounding one another, a second winding made of conductive foil strip and comprising a second plurality of turns surrounding one another, with each turn of the first plurality of turns adjacently surrounded by a turn of the second plurality of turns; wherein innermost endings of the first and second windings are electrically connected at a first terminal, wherein a first and a second connector are provided at an outermost ending of and in contact with the first and second winding, respectively.

The coil or winding configuration may further comprise a second terminal; a first impedance element connected between the second terminal and the first connector ($T_{21}$); and a first impedance element connected between the second terminal and the second connector ($T_{22}$).

The coil or winding configuration may comprise a further winding intertwined with the first and second winding and comprising a further plurality of turns surrounding one another, with an innermost ending of the at least one further winding electrically connected to the first terminal, and with a further connector provided for the further winding at the outermost ending of and in contact with said further winding. The coil or winding configuration may further comprise at least one further impedance element, with the or each further impedance element connected between the second terminal and the further connector.

The first, second and any further windings may be electrically connected, in particular directly electrically connected, exclusively at innermost endings, in particular via the first terminal, and otherwise electrically isolated from one another, or, in other words, the first and second windings may be electrically isolated from one another except for a connection at the innermost ending of the windings, which connection may in particular comprise the first terminal.

Such a winding configuration may, in particular, be produced in accordance with the method described above or certain method variants thereof, wherein the first and second windings are formed by a first one and a second one of the plurality of the M>1 conductive foil strips, with the innermost endings of the first and second winding formed by the first endings of said foil strips, and the outermost endings of the first and second winding formed by the second endings of said foil strips.

The aspects as described above as well as further aspects of the invention will become apparent from and elucidated with reference to the embodiments described hereinafter.

BRIEF DESCRIPTION OF THE DRAWINGS

The subject matter of the invention will be explained in more detail in the following text with reference to exemplary embodiments which are illustrated in the attached drawings.

In principle, identical reference symbols in the figures denote identical features or elements.

DETAILED DESCRIPTION OF EXAMPLE EMBODIMENTS

Figure 1:
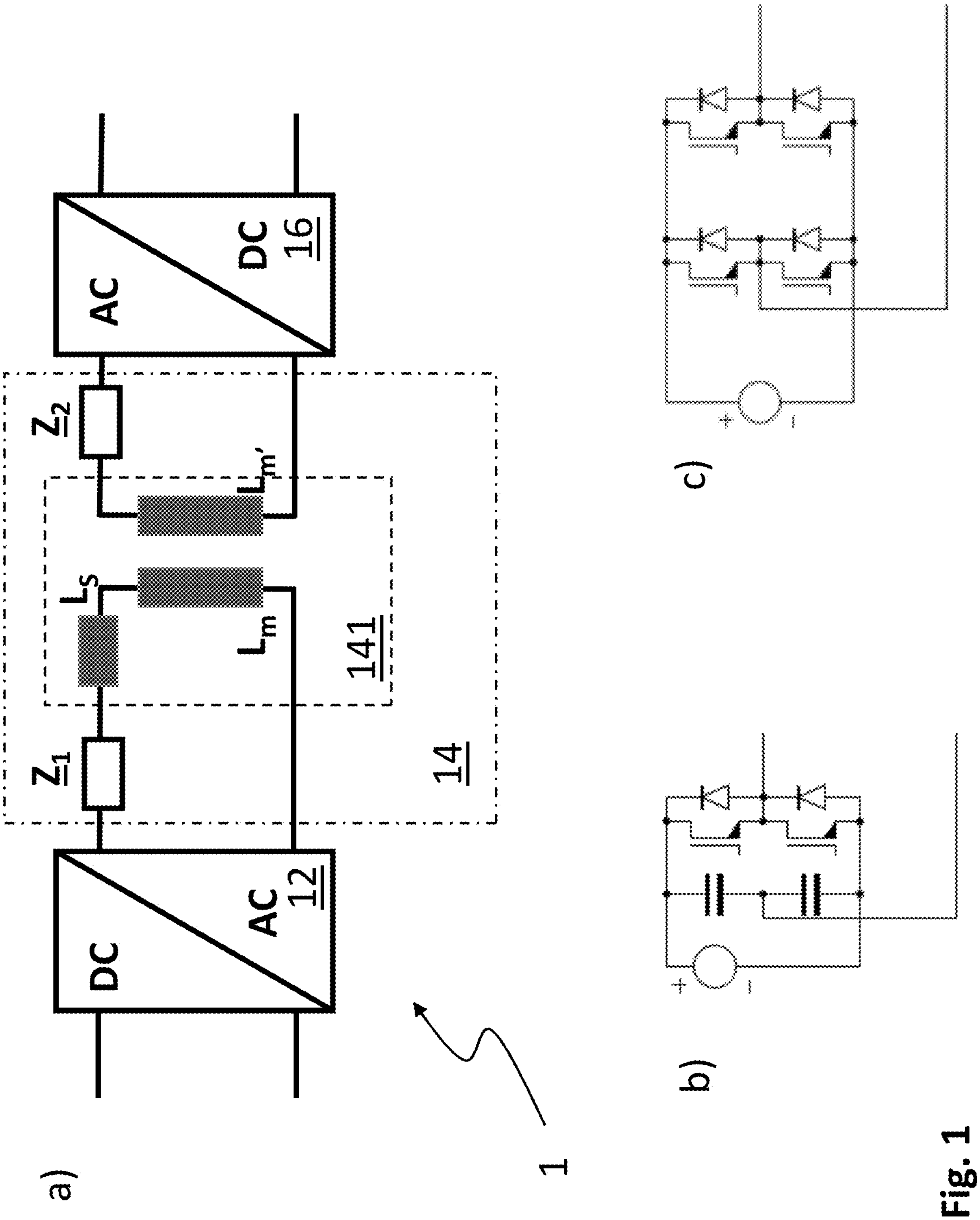
FIG. 1 illustrates a basic, generic, prior art DC/DC converter.

For background information, FIG. 1*a*) illustrates a basic, generic, prior art DC/DC converter 1 as part of which the present invention may be used. A DC/AC converter 11 is configured to convert a DC voltage and/or current from a DC source, preferably comprising a DC link capacitor, connected to its input into an AC voltage and/or current of medium frequency, i.e. preferably in a frequency range between 500 Hz and 500 kHz. Said AC voltage and/or current is fed into an AC intermediate circuit 12 comprising a transformer 141, in particular a medium frequency transformer (MFT), said transformer comprising a primary and a secondary side, and providing galvanic insulation between said sides. The transformer may, inter alia, be characterized by coupled inductances $L_m$ and $L_{m'}$ and a stray inductance $L_s$, with its primary side winding or windings connected to the DC/AC converter via an inductance element having an impedance $\underline{Z}_1$, which may also be a parasitic inductance, in particular of a wire or other connection. The transformer transforms voltage and/or current at its primary side in a known manner to a secondary side voltage and/or current. Said secondary side voltage and/or current is subsequently converted by AC/DC converter 16, in particular a rectifier, into a DC voltage and/or current at the output of said AC/DC converter 16. DC/AC converter 12 may, in particular, comprise a plurality of semiconductor switches arranged in a half-bridge configuration as shown in FIG. 1*a*, or arranged in a full-bridge configuration as shown in FIG. 1*b*). Likewise, AC/DC converter 16 may, in particular, comprise a plurality of semiconductor switches arranged in a half-bridge configuration corresponding to the one shown in FIG. 1*a*, or arranged in a full-bridge configuration corresponding to the one shown in FIG. 1*c*).

Figure 2:
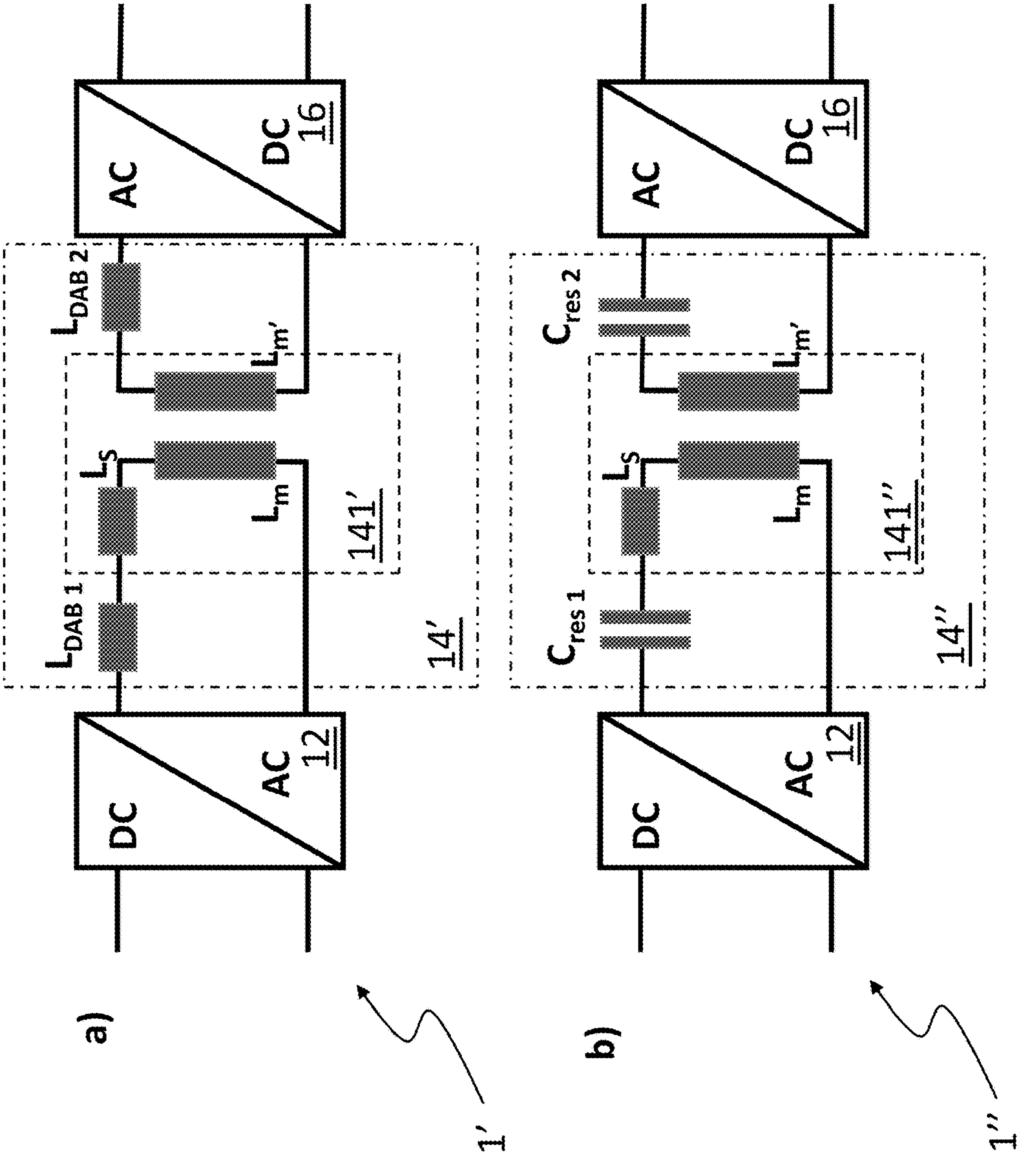
FIG. 2*a*) illustrates a basic, prior art DC/DC dual active bridge (DAB) converter.
FIG. 2*b*) illustrates a basic, prior art resonant DC/DC converter.

FIG. 2*a*) illustrates a basic, prior art DC/DC dual active bridge (DAB) converter 1' which may be considered as an embodiment of the DC/DC converter 1 shown in FIG. 1*a*), and as another potential starting point for the present invention. DC/AC converter 11 is configured to convert a DC voltage and/or current from a DC source, preferably comprising a DC link capacitor, connected to its input into an AC voltage and/or current of medium frequency, i.e. preferably in a frequency range between 500 Hz and 500 kHz. Said AC voltage and/or current is fed into an AC intermediate circuit 14' comprising a transformer 141', in particular a medium frequency transformer (MFT), said transformer comprising a primary and a secondary side, and providing galvanic insulation between said sides. The transformer may, inter alia, be characterized by coupled inductances $L_m$ and $L_{m'}$ and a stray inductance $L_s$, with its primary side winding or windings connected to the DC/AC converter via an inductor as impedance element, with said inductor, sometimes referred to as an energy transfer inductor, having an inductance $L_{DAB\ 1}$. The transformer transforms voltage and/or current at its primary side in a known manner to a secondary side voltage and/or current. Said secondary side voltage and/or current is subsequently converted by AC/DC converter 16', in particular a rectifier, into a DC voltage and/or current at the output of said AC/DC converter 16. An optional inductor connected between the secondary side of the transformer and the AD/DC converter preferably has an inductance $L_{DAB\ 2}$ which preferably is at least essentially identical to $L_{DAB\ 1}$. DC/AC converter 12 may, in particular, comprise a plurality of semiconductor switches arranged in a half-bridge configuration corresponding to the one shown in FIG. 1*b*), or arranged in a full-bridge configuration corresponding to the one shown in FIG. 1*c*). Likewise, AC/DC converter 16 may, in particular, comprise a plurality of semiconductor switches arranged in a half-bridge configuration corresponding to the one shown in FIG. 1*b*), or arranged in a full-bridge configuration corresponding to the one shown in FIG. 1*c*). Dual active bridge converters are also exemplary described in Swiss patent application publication CH 707 533 A2 or US patent application publication US 2018/0159435 A1.

FIG. 2*b*) illustrates a basic, prior art resonant DC/DC converter 1" which may be considered as another embodiment of the DC/DC converter 1 shown in FIG. 1*a*), and as yet another potential starting point for the present invention. DC/AC converter 11 is configured to convert a DC voltage and/or current from a DC source, preferably comprising a DC link capacitor, connected to its input into an AC voltage and/or current of medium frequency, i.e. preferably in a frequency range between 500 Hz and 500 kHz. Said AC voltage and/or current is fed into an AC intermediate circuit 14" comprising a transformer 141", in particular a medium frequency transformer (MFT), said transformer comprising a primary and a secondary side, and providing galvanic insulation between said sides. The transformer may, inter alia, be characterized by coupled inductances $L_m$ and $L_{m'}$ and a stray inductance $L_s$, with its primary side winding or windings connected to the DC/AC converter via capacitor as impedance element, with said capacitor having a capacitance $C_{res1}$. The capacitor together with the stray inductance is part of a resonant tank comprised by the AC intermediate circuit, which may store electric energy, and which is characterized by a resonance frequency, which in turn depends on the values of $L_s$ and $C_{res1}$. The capacitor is therefore commonly referred to as a resonant capacitor. The transformer transforms voltage and/or current at its primary side in a known manner to a secondary side voltage and/or current. Said secondary side voltage and/or current is subsequently converted by AC/DC converter 16, in particular a rectifier, into a DC voltage and/or current at the output of said AC/DC converter 16. DC/AC converter 12 may, in particular, comprise a plurality of semiconductor switches arranged in a half-bridge configuration corresponding to the one shown in FIG. 1*b*), or arranged in a full-bridge configuration corresponding to the one shown in FIG. 1*c*). Likewise, AC/DC converter 16 may, in particular, comprise a plurality of semiconductor switches arranged in a half-bridge configuration corresponding to the one shown in FIG. 1*b*), or arranged in a full-bridge configuration corresponding to the one shown in FIG. 1*c*). As an alternative to the variant comprising active bridges as described above and allowing for bi-directional electric power flow, AC/DC converter 16 may, in particular, be embodied without semiconductor switches and comprise diodes only arranged in a half-bridge or full-bridge configuration if only unidirectional electric power flow is required. Resonant DC/DC converters are exemplary described in PCT patent application publication WO 2018/141092 A1.

Figure 3:
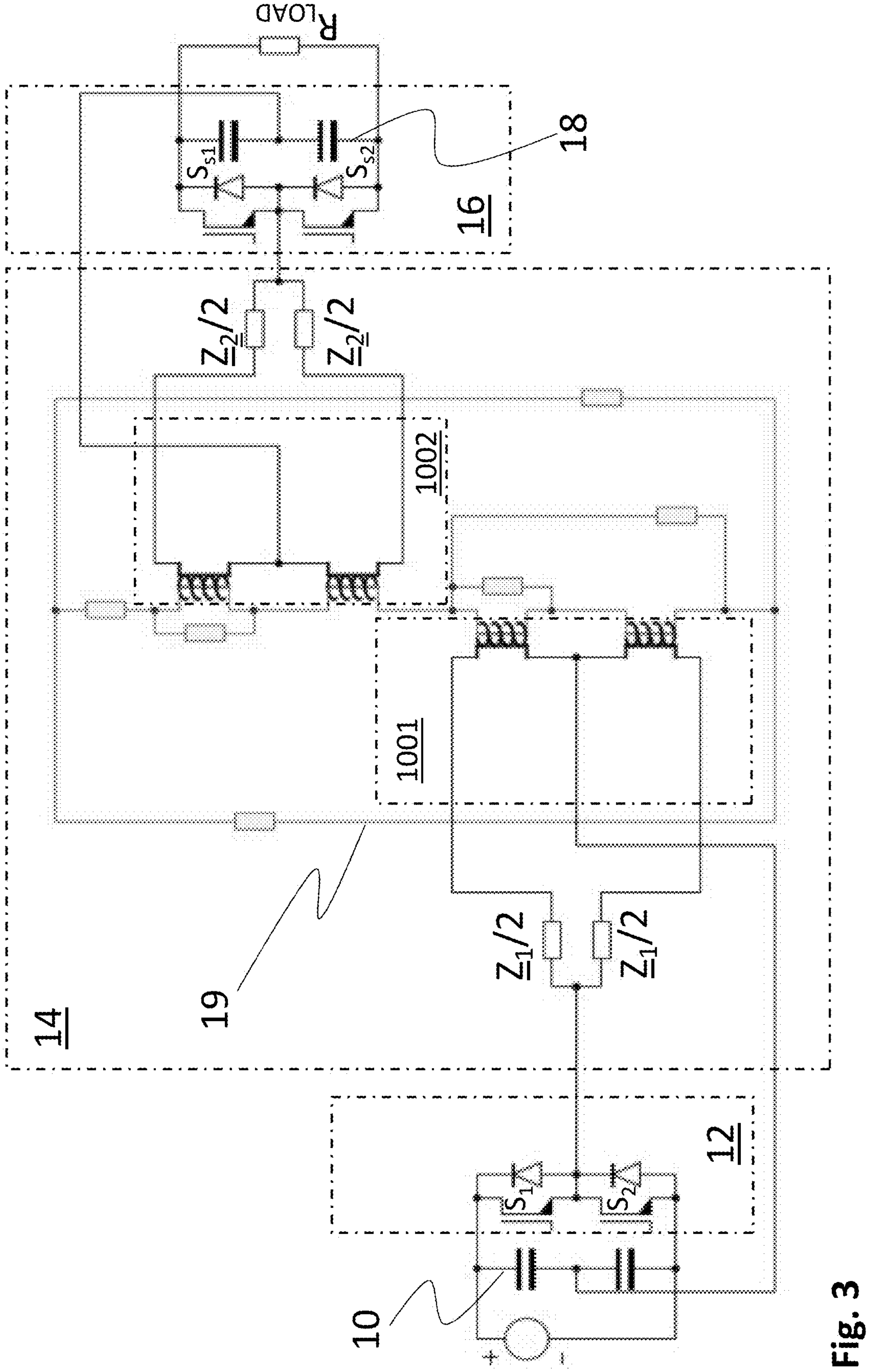
FIG. 3 shows a more detailed schematic of one possible embodiment of the DC/DC converter from FIG. 1.

FIG. 3 shows a more detailed schematic of one possible embodiment of the DC/DC converter from FIG. 1*a*), where two parallel windings are provided on both the primary side 1001 and the secondary side 1002 of the transformer, and impedance elements Z1 and Z2 have been split and distributed between the parallel windings. Also shown, merely for background information, is a voltage source connected to the first DC link 10, a resistive load connected to the second DC link 18 and characterized by a resistance Road, and (in gray) a reluctance network 19 of a core and a stray flux of the transformer.

Figure 4:
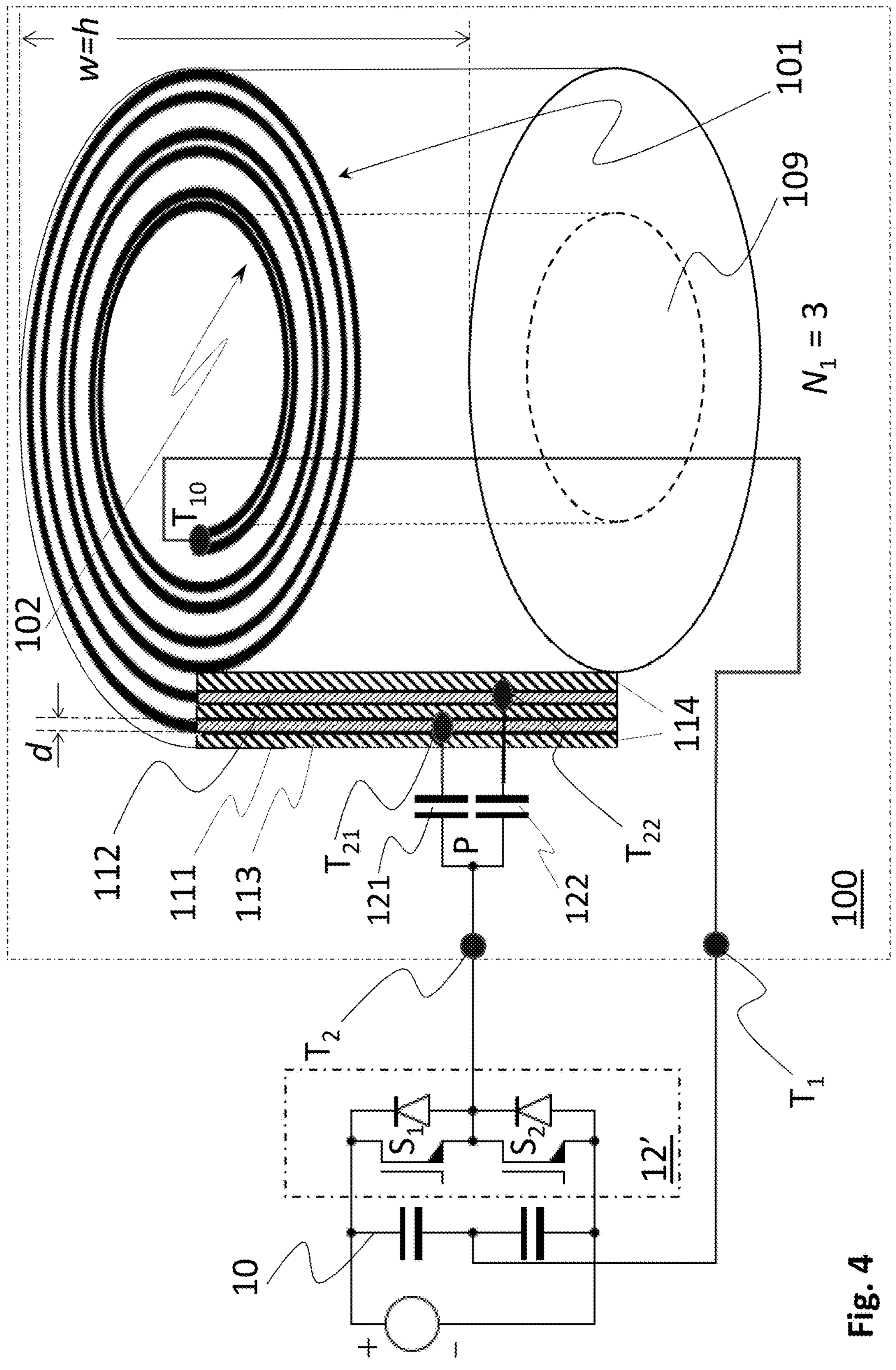
FIG. 4 schematically illustrates a coil in accordance with the present invention.

FIG. 4 schematically illustrates a coil 100 in accordance with the present invention. Coil 100 comprises a first winding 101 made of a first conductive foil strip 111 and a second winding 102 made of a second conductive foil strip 112 which have been layered and coiled up to form a plurality of $N_1=3$ turns around a central opening 109, which may receive a transformer core not shown in FIG. 3. Innermost endings of the first and second windings are electrically connected to one another at $T_{10}$, and to/with a first terminal $T_1$. A first connector $T_{21}$ and a second connector $T_{22}$ are provided at an outermost ending of and in contact with the first and second winding, respectively. An electrically insulating layer 113 is provided between the first conductive foil strip 111 and the second conductive foil strip 112. Further insulating layers 114 are provided on both sides of the first conductive foil strip 111 and the second conductive foil strip 112. The first and second windings are directly electrically connected only at the innermost ending of the windings at $T_{10}$. The coil further comprises a second terminal $T_2$, a capacitor 121 connected between the second terminal and the first connector $T_{21}$; and a second capacitor 122 connected between the second terminal and the second connector $T_{22}$. A height h of coil 100 corresponds to a width w of the first and second conductive foil strip.

Merely for illustration, FIG. 4 also shows a DC link 10 and a DC/AC converter 12' comprising an active half bridge comprising a plurality of two semiconductor switches $S_1$, $S_2$ for applying an AC voltage to the coil 100.

Figure 5:
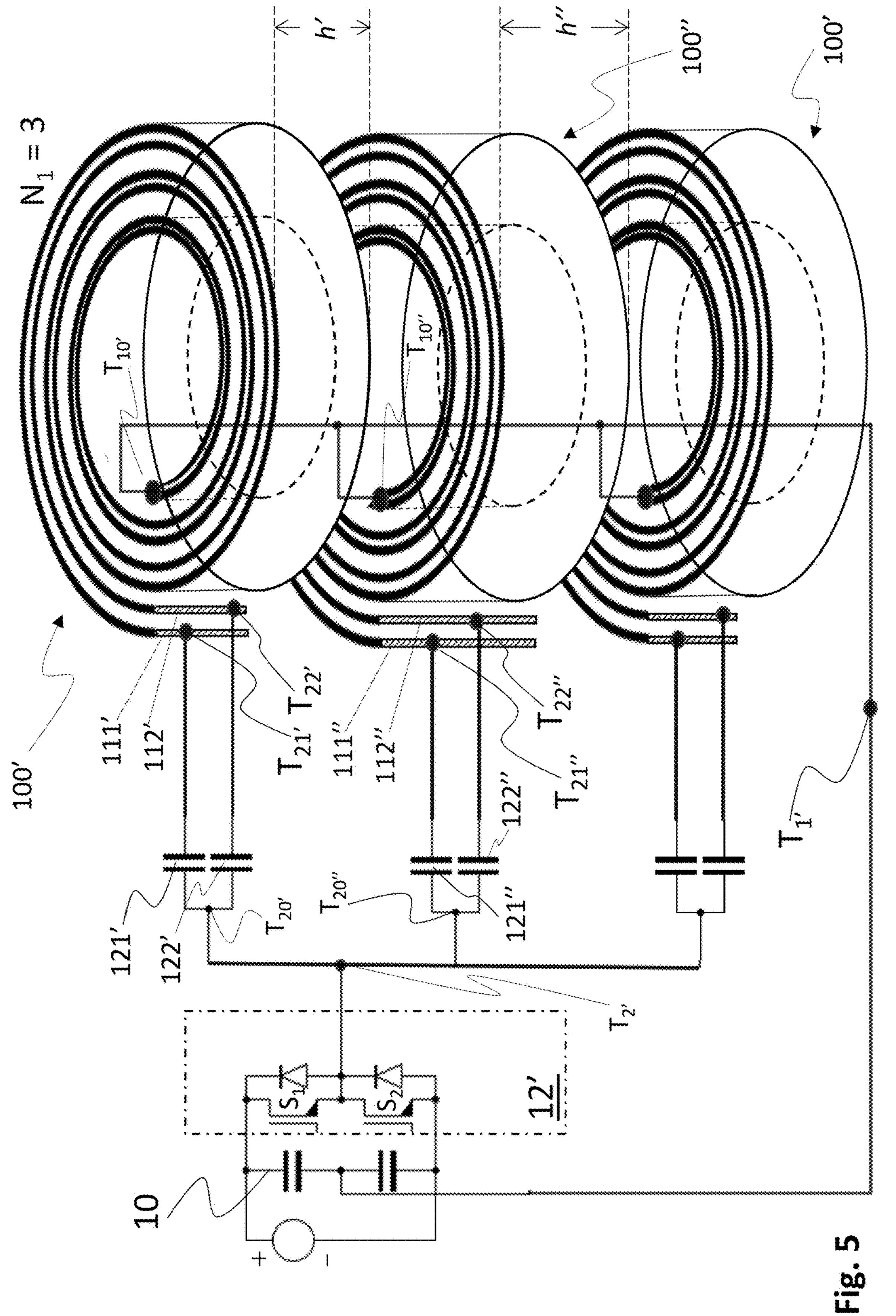
FIG. 5 shows illustrates a stack of three coils in accordance with the present invention.

FIG. 5 illustrates a stack of three coils, two first coils 100' and a second coil 100", each of which three coils essentially corresponds to coil 100 from FIG. 3 albeit for a height, which is h' for the first two coils 100', and h" for the second coil 100". By choosing different values for the capacitances 121', 122' and 121", 122", a current in the coils 100' will be different from a current in the coil 100". This may be used to advantage to make a current density at least approximately identical in the three coils by selecting appropriate capacitances, including compensation of any possibly increased current in outermost foils 100' due to distortions in a transformer stray field, in particular a winding window stray field.

As illustrated in FIG. 5 some embodiments include a DC link 10 and DC/AC converter 12' comprising an active half bridge comprising a plurality of two semiconductor switches $S_1$, $S_2$ for applying an AC voltage to coils 100', 100".

Figure 6:
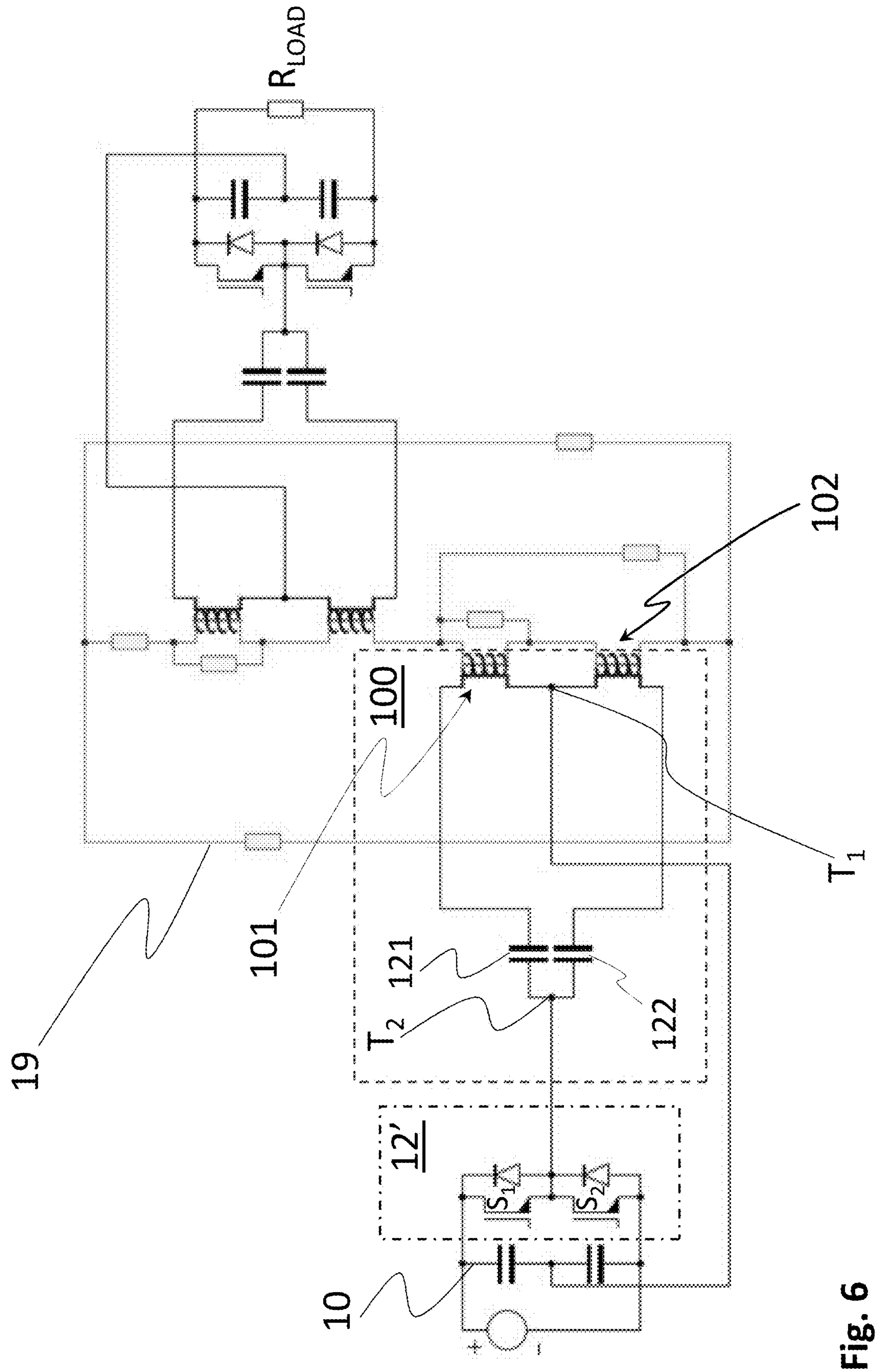
FIG. 6 shows a schematic of an exemplary resonant DC/DC converter.

FIG. 6 shows a schematic of an example resonant DC/DC converter as an embodiment of the DC/DC converter from FIG. 3. Coil 100 comprising a pair of M=2 windings, and a pair of capacitors 121, 122 is connected between an output of the DC link 10 and a neutral terminal of the DC link 10.

Figure 7:
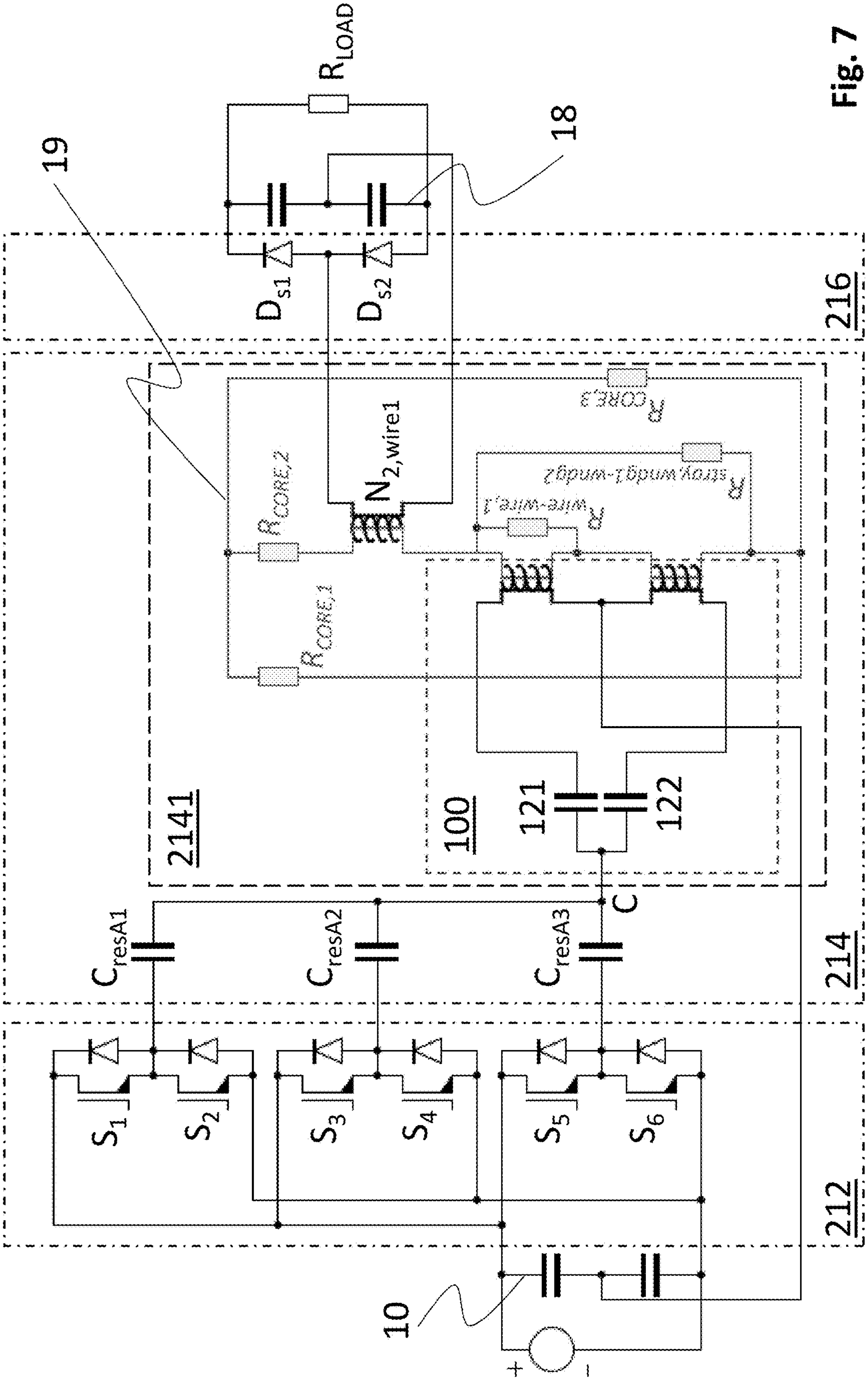
FIG. 7 shows a schematic of another exemplary resonant DC/DC converter.

FIG. 7 shows a schematic of another example resonant DC/DC converter as part of which various embodiments of a coil in accordance with the invention or produced in accordance with the invention may be used. The converter comprises a first DC link 10, a DC/AC converter 212 comprising a plurality of semiconductor switches $S_1$, $S_2$, $S_3$, . . . , $S_6$, an AC intermediate circuit 214, an AC/DC converter 216, and a second DC link 18. The converter comprises a plurality of active half bridges which are connected to a single, first DC link 10, while each of their outputs is connected via an individual one of a first plurality (N=3) of capacitors $C_{resA}$ and a common node C to a primary coil of a medium frequency transformer 2141, said transformer providing, inter alia, for galvanic insulation between a primary and a secondary side of said transformer. Coil 100 comprising a pair of M=2 windings, and a pair of capacitors 121, 122 is connected between common node C and a neutral terminal of the DC link 10. Also shown, merely for background information, is a voltage source connected to the first DC link 10, a resistive load connected to the second DC link 18 and characterized by a resistance $R_{load}$, and (in gray) a reluctance network 19 of a core and a stray flux of the transformer 2141.

Preferred embodiments of the present invention, in particular as described above, may be realized as detailed in the numbered variants and/or embodiments in accordance with the items listed below, advantageously in combination with one or more of the features as detailed above, or in accordance with the claims as presented further below.

1) A method for producing a coil (100, 100') for a transformer, in particular for a medium frequency transformer for a resonant DC/DC converter 1" or a dual active bridge DC/DC converter 1', comprising the steps of:

a) providing a plurality M>1 of, conductive foil strips (111, 112, 111', 112', 111", 112"), in particular elongate conductive foil strips, each having a first ending and a second ending;

b) stacking the plurality of conductive foil strips to obtain a foil strip stack having a first ending and a second ending, wherein an electrically insulating layer 113 is provided between any two adjacent conductive foil strips;

c) electrically connecting the first endings of all conductive foil strips to a first terminal (T1, T1');

d) for each of the conductive foil strips providing a connector ($T_{21}$, $T_{22}$, $T_{21'}$, $T_{22'}$, $T_{21'}$, $T_{22'}$) at the second ending of the foil strip; and e) coiling up the foil strip stack from the first end.

2) The method of variant 1, wherein the foil stack is coiled up to form a coil (100, 100') having a central opening 109, in particular extending in a lateral direction.

3) The method of any preceding variant, further comprising the step of a) providing a second terminal ($T_2$, $T_2$);

b) providing a plurality of M impedance elements, c) for each connector ($T_{21}$, $T_{22}$, $T_{21'}$, $T_{22'}$, $T_{21'}$, $T_{22'}$), connecting a different one of said impedance elements between the connector and the second terminal.

4) The method of any preceding variant, further comprising the step of casting an insulating material around the coil (100, 100'), and preferably around the impedance elements, wherein a passageway extending through the central opening 109 is provided in the insulating material.

5) The method of any preceding variant, wherein the impedance elements are capacitors (121, 122, 121', 122', 121", 122"), preferably all having an at least approximately identical capacitance.

6) The method of any of method variants 1 to 4, wherein the impedance elements are inductors, preferably all having an at least approximately identical inductance.

7) A coil (100, 100') or winding configuration, in particular produced according to one of method variants 1 to 6, for a transformer, in particular a medium frequency transformer for a resonant DC/DC converter 1" or a dual active bridge DC/DC converter 1', said coil comprising a) a pair of windings 101, 102 wound around a central opening 109, said pair of windings comprising:

i) a first winding 101 made of a first conductive foil strip (111, 111', 111") and comprising a first plurality of turns surrounding one another;

ii) a second winding 102 made of a second conductive foil strip (112, 112', 112") and comprising a second plurality of turns surrounding one another, with each turn of the first plurality of turns adjacently surrounded by a turn of the second plurality of turns; wherein iii) innermost endings of the first and second windings are electrically connected to and/or with a first terminal $T_1$, in particular to provide an output terminal;

wherein b) a first connector $T_{21}$ and a second connector $T_{21}$ are provided, in particular as input terminal, at an outermost ending of and in contact with the first and second winding, respectively.

8) The coil according to embodiment 7, wherein the first connector $T_{21}$ is not in contact with the second winding, and the second connector $T_{21}$ is not in contact with the first winding.

9) The coil according to one of embodiments 7 or 8, wherein the pair of windings 101, 102 is intertwined.

10) The coil according to one of embodiments 7 to 9, wherein the pair of windings 101, 102 is not twisted.

11) The coil according to one of embodiments 7 to 10, wherein the pair of windings 101, 102 is free of transpositions.

12) The coil according to one of embodiments 7 to 11, further characterized in that the coil further comprises a) a second terminal $T_2$;

b) a first impedance element connected between the second terminal and the first connector $T_{21}$; and c) a second impedance element connected between the second terminal and the second connector $T_{22}$.

13) The coil according to the preceding embodiment, wherein the impedance elements are capacitors (121, 122, 121', 122', 121", 122"), preferably all having an at least approximately identical capacitance.

14) The coil according to embodiment 12, wherein the impedance elements are inductors, preferably all having an at least approximately identical inductance.

15) The coil according to one of embodiments 7 to 14, wherein the first and second windings are electrically isolated from one another except for a connection, in particular via the first terminal $T_1$, at the innermost ending of the windings.

16) The coil according to one of embodiments 7 to 15, further characterized in that the first and second windings are electrically exclusively connected via the first terminal, and are otherwise electrically isolated from one another.

17) The coil according to one of embodiments 7 to 16, comprising at least one further winding intertwined with the first and second winding and comprising a further plurality of turns surrounding one another, with a) an innermost ending of the at least one further winding electrically connected to the first terminal $T_1$;

b) a further connector is provided, in particular as input terminal, for each of the at least one further winding at the outermost ending of and in contact with said further winding.

18) The coil according to the previous embodiment, wherein all the windings are electrically exclusively connected via the first terminal, and are otherwise electrically isolated from one another.

19) The coil according to one of embodiments 7 to 18, wherein the pair or plurality of windings is formed from a coiled up stack of conductive foil strips, each having a first end and a second end; and with an insulating layer provided between any two adjacent conductive foil strips.

20) A transformer, in particular a medium frequency transformer for a resonant DC/DC converter or a resonant solid-state-transformer cell, said transformer comprising a) a core, preferably having a core gap;

b) at least a first coil (100, 100', 100") according to one of embodiments 7 to 19 or produced according to one of method variants 1 to 6, with the pair of windings surrounding at least a section of the core, with said section extending through the central opening 109 of the windings.

21) A transformer, according to the previous embodiment, wherein the first winding 101 and the second winding are primary windings of the transformer.

22) A transformer according to the previous embodiment, further comprising at least a second coil (100, 100', 100") according to one of embodiments 7 to 19 or produced according to one of method variants 1 to 6, with the pair of windings of the second coil surrounding at least another section of the core, with said another section extending through the central opening of the windings, and wherein the pair of windings of the second coil are secondary windings of the transformer.

23) A transformer, according to the previous embodiment, wherein the first winding 101 and the second winding 102 of the second coil are secondary windings of the transformer.

24) A transformer according to one of embodiments 20 to 21, comprising a plurality of coils (100, 100', 100") according to one of embodiments 7 to 19 or produced according to one of method variants 1 to 6, with the first terminals of all coils connected together.

25) A transformer according to the previous embodiment, wherein
  a) a first coil has a height $h_1$, wherein the impedance elements are all capacitors, having an at least approximately identical capacitance $C_1$;
  b) a second coil has a height $h_2$, wherein the impedance elements are all capacitors, having an at least approximately identical capacitance $C_2$;
  c) wherein at least approximately $C_1/h_1=C_2/h_2$.

26) A transformer according to embodiment 24, wherein
  a) a first coil has a height $h_1$, wherein the impedance elements are all inductances, having an at least approximately identical inductance $L_1$;
  b) a second coil has a height $h_2$, wherein the impedance elements are all capacitors, having an at least approximately identical inductance $L_2$;
  c) wherein at least approximately $L_1 \cdot h_1=L_2 \cdot h_2$.

27) A transformer according to one of embodiment 24 to 26, wherein
  a) two neighboring coils are spaced apart by a coil gap between said neighboring coils;
  b) the core has a core gap, in particular an air gap;
  c) the coil gap is aligned with, overlaps and/or or coincides with the core gap, in particular with respect to a lateral direction.

28) A transformer according to one of embodiment 20 to 27, wherein the or a second coil surrounds the first coil, preferably with the first coil extending within and/or through the central opening 109 of the windings of the first coil.

29) A transformer according to one of embodiment, wherein the windings of the first coil are primary windings of the transformer, and the windings of second first coil are secondary winding; or vice versa.

30) A resonant DC/DC converter or a resonant solid-state-transformer cell comprising a transformer according to one of the above embodiments.

31) A DC/DC converter, comprising
  a) a first DC link, preferably comprising a first DC link capacitor;
  b) an inverter bridge connected to the first DC link;
  c) a transformer, preferably a medium frequency transformer, in particular according to one of embodiments 20 to 29, preferably having a primary side and a secondary side;
  d) the primary side of the transformer comprising at least one coil according to one of embodiments 7 to 19 or produced according to one of method variants 1 to 6.

32) A DC/DC converter, comprising
  a) a first DC link, preferably comprising a first DC link capacitor;
  b) a plurality of N>1 inverter bridges connected in parallel to the first DC link;
  c) a transformer, in particular according to one of embodiments 20 to 29, preferably a medium frequency transformer, preferably having a primary side and a secondary side;
  d) the primary side of the transformer comprising at least one coil according to one of embodiments 7 to 19 or produced according to one of method variants 1 to 6; wherein
  e) the converter further comprises a first plurality of N further impedance elements, wherein
  f) for each converter bridge, a different one from the first plurality of impedance elements is connected between said converter bridge and the coil, in particular between said converter bridge and the second terminal of the coil.

33) A DC/DC converter, comprising
  a) a first DC link, preferably comprising a first DC link capacitor;
  b) a DC/AC converter having an input connected to the first DC link and comprising:
    i) a converter bridge connected to the first DC link;
  c) an AC intermediate circuit having an input connected to an output of the DC/AC converter and comprising
    i) a transformer, preferably a medium frequency transformer, having a primary side and a secondary side;
    ii) the primary side comprising at least one coil according to one of embodiments 7 to 19 or produced according to one of method variants 1 to 6;
  d) an AC/DC converter having an input connected to the secondary side of the AC intermediate circuit,
  e) a second DC link, preferably a second DC link capacitor, connected to an output of the AC/DC converter.

34) A DC/DC converter, comprising
  a) a first DC link, preferably comprising a first DC link capacitor;
  b) a DC/AC converter having an input connected to the first DC link and comprising:
    i) a first plurality of N>1 converter bridges connected in parallel to the first DC link;
  c) an AC intermediate circuit having an input connected to an output of the DC/AC converter and comprising
    i) a transformer, preferably a medium frequency transformer, having a primary side and a secondary side;
    ii) the primary side comprising at least one coil according to one of embodiments 7 to 19 or produced according to one of method variants 1 to 6;
  d) an AC/DC converter having an input connected to the secondary side of the AC intermediate circuit, e) a second DC link, preferably a second DC link capacitor, connected to an output of the AC/DC converter; wherein f) the AC intermediate circuit further comprises a first plurality of N impedance elements, wherein g) for each converter bridge, a different one from the first plurality of impedance elements is connected between said converter bridge and the at least one coil, in particular between said converter bridge and the second terminal of the at least one coil.

35) The DC/DC converter in accordance with any of embodiments 28 to 31, wherein each of the converter bridges is an inverter half-bridge comprising a first input terminal and a second input terminal, an inverter bridge output (alternatively conductively connectable to the first or second input terminal by means of a plurality of semiconductor switches), wherein for each inverter half-bridge, a different one of the first plurality of impedance elements is connected in series with the inverter bridge output.

36) The DC/DC converter in accordance with any of the preceding embodiments, wherein a) the first DC link has a positive terminal and negative terminal, b) the first input terminals of all inverter half-bridges are connected to the positive terminal, and c) the second input terminals of all inverter half-bridges are connected to the negative terminal.

37) The DC/DC converter in accordance with any of the embodiments 31 to 36, wherein the first DC link further has a neutral terminal and the second terminals of all of the plurality of primary windings are connected to the neutral terminal.

38) The DC/DC converter in accordance with any of the embodiments 31 to 37, wherein the converter is a resonant converter, and each of the plurality of impedance elements is a capacitor.

39) The DC/DC converter in accordance with any of the embodiments 31 to 38, wherein the converter is a dual active bridge converter, and each of the plurality of impedance elements is an inductor.

40) The DC/DC converter in accordance with any of the embodiments 31 to 3639 further comprising a) a second DC link, preferably comprising a second DC link capacitor b) a rectifier bridge connected to the second DC link;

c) the secondary side of the transformer comprising at least one coil according to one of embodiments 7 to 19 or produced according to one of method variants 1 to 6.

41) The DC/DC converter in accordance with any of the embodiments 31 to 40, further comprising a) a second DC link, preferably comprising a second DC link capacitor;

b) a plurality of N'>1 rectifier bridges connected in parallel to the second DC link;

c) the secondary side of the transformer comprising at least one further coil according to one of embodiments 7 to 19 or produced according to one of method variants 1 to 6; wherein d) the converter further comprises a third plurality of N' further impedance elements, wherein e) for each converter bridge, a different one from the third plurality of impedance elements is connected between said converter bridge and the coil, in particular between said converter bridge and the second terminal of the coil.

42) A stack of coils comprising a plurality of coils according to one of embodiments 7 to 19 or produced according to one of method variants 1 to 6.

43) A stack of coils according to embodiment 42, wherein the central openings of all coils are aligned with respect to one another, and/or with respect to a lateral direction.

44) A stack of coils according to embodiment 42 or 43, wherein the first terminals of all coils are connected.

45) A stack of coils according to one of embodiments 42 to 45, said stack cast or molded into an insulating material surrounding, in particular integrally surrounding, all the coils, in particular with the central openings of all the coils be at least essentially aligned, and in particular configured to receive a section or portion of a transformer core, which may be essentially straight and/or elongated, so that said section extends or portion through the central openings of all the coils.

46) A transformer, in particular a medium frequency transformer for a resonant DC/DC converter or a resonant solid-state-transformer cell, said transformer comprising a) a core, preferably having an air gap;

b) at stack of coils according to one of embodiments 42 to 45, wherein c) a section of the core extends through the central opening 109 of all the coils of the stack.

47) A transformer according to the previous embodiment wherein a) two neighboring coils in the stack of coils are spaced apart by a coil gap between said neighboring coils;

b) the core has a core gap, in particular an air gap;

c) the coil gap is aligned with, overlaps and/or or coincides with the core gap, in particular with respect to a lateral direction.

Unless specified otherwise, a connection, in particular between any two entities, including in particular nodes, points, terminals, elements, devices, etc. or combinations thereof, refers to an electrically conductive connection, as in particular established by a wire, cable, busbar, a conductive track, trace or line on e.g. a (printed) circuit board, solder, etc. The electrically conductive connection is preferably at least substantially direct, in particular without any discrete elements, as, in particular, resistors, capacitors, inductors, or other passive or active elements or devices connected between the connected entities. The electrically conductive connection thus has at least essentially negligible resistance, capacitance and inductance, preferably at least essentially zero resistance, capacitance and inductance. In particular, resistance, capacitance and inductance of the electrically conductive connection are exclusively parasitic by nature. Further, resistance, capacitance and inductance of the electrically conductive connection significantly smaller (preferably by a factor of 1/100, 1/1000 or 1/10000) than resistances, capacitances and impedances of resistors, capacitors or inductors, respectively, connected by the electrical conductive connection, and/or comprised by an electric circuit or network which comprises the electrically conductive connection.

Unless specified otherwise, an electric connection or electrical connection is identical to connection as defined above.

Unless specified otherwise, if two entities, including in particular nodes, points, terminals, elements, devices, etc. or combinations thereof, are said to be connected, electrically connected or to be (electrically) connected together, a connection as defined above exists between the two entities.

Unless specified otherwise, if a first and a second entity, including in particular a first and second node, point, terminal, element, device, etc. or combinations thereof, are said to be connected via a third entity, including in particular a third node, point, terminal, element, device, or with such a third entity (in) between, a connection as described above exists between the first and third entities as well as between the third and second entities. However, no connection as described above, in particular no at least substantially direct connection exists between the first and second entities. If explicitly specified, the third element may in particular also be a connection, in particular a conductor, wire, cable, busbar etc. In such case, it may be assumed that no connection as described above other than the specified one is present.

Unless stated otherwise, it is assumed that throughout this patent application, a statement $a \approx b$ implies that $|a-b|/(|a|+|b|)<10$, preferably $|a-b|/(|a|+|b|)<100$, wherein a and b may represent arbitrary variables as described and/or defined anywhere in this patent application, or as otherwise known to a person skilled in the art. Further, a statement that a is at least approximately equal or at least approximately identical to b implies that $a \approx b$, preferably $a=b$. Further, unless stated otherwise, it is assumed that throughout this patent application, a statement $a>>b$ implies that $a>10b$, preferably $a>100b$; and statement $a<<b$ implies that $10a<b$, preferably $100a<b$. Further, unless stated otherwise, it is assumed that throughout this patent application, a statement that $a>>b$, or that a is significantly larger or much larger than b, implies that $a>10b$, preferably $a>100b$; and statement that $a<<b$, or that a is significantly smaller or much smaller than b implies that $10a<b$, preferably $100a<b$. Further, a statement that two values a and b substantially deviate from one another, or differ significantly, implies that $a \approx b$ does not hold, in particular that $a>>b$ or $a<<b$.

This description and the accompanying drawings that illustrate aspects and embodiments of the present invention should not be taken as limiting the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope of the following claims. In particular, the present invention covers further embodiments with any combination of features from different and/or individual embodiments as described above and below. Embodiments in accordance with the invention may, in particular, include further and/or additional features, elements, aspects, etc. not shown in the drawings or described above.

Method steps listed in the description and, in particular, in the claims, are preferably carried out in the order as listed, but may alternatively be carried out in any other order in as far as technically and practically feasible.

The disclosure also covers all further features shown in the Figures, individually, although they may not have been described in the afore or following description. Also, individual alternatives of the embodiments described in the Figure and the description and individual alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude further or additional features, elements, steps etc., and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute, property or a value particularly also comprise exactly the attribute, property or value, respectively, as stated. The term "approximately" or "about" in the context of a given numerate value or range refers to a value or range that is, e.g., within 20%, within 10%, within 5%, or within 2% of the given value or range, and, in particular, also comprises the exact value or range as stated. Components described as coupled or connected may be electrically or mechanically directly coupled, or they may be indirectly coupled via one or more intermediate components. Any reference signs in the claims shall not be construed as limiting the scope.

The invention claimed is:

1. A method for producing a coil for a transformer for a resonant DC/DC converter or a dual active bridge DC/DC converter, comprising:

providing a plurality M>1 of conductive foil strips each having a first ending and a second ending;

stacking the plurality of conductive foil strips to obtain a foil strip stack having a first ending and a second ending, wherein an electrically insulating layer is provided between any two adjacent conductive foil strips;

electrically interconnecting the first endings of all conductive foil strips of the foil strip stack to a same first terminal;

for each of the conductive foil strips of the foil strip stack providing a separate connector at the second ending of the foil strip; and coiling up the foil strip stack from the first ending.

2. The method of claim 1, wherein the foil stack is coiled up to form a coil having a central opening.

3. The method of claim 1, further comprising:

providing a second terminal;

providing a plurality of M impedance elements; and for each connector, connecting a different one of said impedance elements between the connector and the second terminal.

4. The method of claim 3, further comprising: casting an insulating material around the coil, and around the impedance elements, wherein a passageway extending through a central opening is provided in the insulating material.

5. The method of claim 3, wherein the impedance elements are capacitors, all having an at least same capacitance within a range of 20%.

6. The method of claim 3, wherein the impedance elements are inductors, all having an at least same inductance within a range of 20%.

7. A coil produced according to claim 1, for a transformer for a resonant DC/DC converter or a dual active bridge DC/DC converter, said coil comprising:

a pair of windings, said pair of windings comprising:

a first winding made of a first conductive foil strip and comprising a first plurality of turns surrounding one another;

a second winding made of a second conductive foil strip and comprising a second plurality of turns surrounding one another, with each turn of the first plurality of turns adjacently surrounded by a turn of the second plurality of turns; wherein innermost endings of the first and second windings are electrically interconnected and connected to and/or with a first terminal; and the first and second windings are electrically isolated from one another except for a connection, wherein a first connector and a second connector are provided at an outermost ending of and in electrical contact with the first and second winding, respectively; and a second terminal with a first impedance element connected between the second terminal and the first connector; and a second impedance element connected between the second terminal and the second connector.

8. The coil according to claim 7, wherein the impedance elements are capacitors, all having an at least same capacitance within a range of 20%.

9. The coil according to claim 7, wherein the impedance elements are inductors, all having an at least same inductance within a range of 20%.

10. The coil according to claim 9, wherein the first and second windings are directly electrically connected at a connection via the first terminal at the innermost endings of the windings, and are directly electrically isolated from one another otherwise.

11. The coil according to claim 7, wherein the first and second windings are directly electrically connected at a connection via the first terminal at the innermost endings of the windings, and are directly electrically isolated from one another otherwise.

12. The coil according to claim 7, wherein the pair of windings is formed from coiled up stack of conductive foil strips, each having a first end and a second end; and with an insulating layer provided between any two adjacent conductive foil strips.

13. A transformer for a resonant DC/DC converter or a resonant solid-state-transformer cell, said transformer comprising:

a core, having an air gap; and at least a first coil according to claim 7.

14. The transformer according to claim 13, wherein the impedance elements are inductors, all having an at least same inductance within a range of 20%.

15. A transformer according to claim 13, said transformer comprising:

a core having an air gap; and at least a first coil with the pair of windings surrounding at least a section of the core, with said section extending through a central opening of the first coil, comprising a plurality of coils with the first terminals of all coils connected together.

16. A transformer according to claim 13, comprising:

a core, having an air gap; and at least a first coil according to claim 8 with the pair of windings surrounding at least a section of the core, with said section extending through a central opening of the first coil, comprising a plurality of coils, with the first terminals of all coils connected together.

17. The transformer according to claim 16, wherein the first and second windings are directly electrically connected at a connection via the first terminal at the innermost endings of the windings, and are directly electrically isolated from one another otherwise.

18. A transformer for a resonant DC/DC converter or a resonant solid-state-transformer cell, said transformer comprising:

a core, having an air gap; and at least a first coil comprising a plurality of coils according to claim 7 with the pair of windings surrounding at least a section of the core, with said section extending through a central opening of the first coil, with the first terminals of the plurality of coils connected together.

19. A transformer according to claim 18, wherein the first coil has a height h1, wherein the impedance elements are all capacitors, having an at least same capacitance C1 within a range of 20%; and a second coil has a height h2, wherein the impedance elements are all capacitors, having an at least same capacitance C2 within a range of 20%;

wherein at least approximately $C1/h1=C2/h2$.

20. A transformer for a resonant DC/DC converter or a resonant solid-state-transformer cell, said transformer comprising:

a core, having an air gap; and at least a first coil according to claim 7, with the pair of windings surrounding at least a section of the core, with said section extending through a central opening of the first coil.

* * * * *